(12) United States Patent
Alamuri et al.

(10) Patent No.: US 11,836,201 B2
(45) Date of Patent: Dec. 5, 2023

(54) SYSTEM AND METHOD FOR AUTOMATED DATA SCREENING FOR BACKGROUND VERIFICATION

(71) Applicant: Cognizant Technology Solutions India Pvt. Ltd., Chennai (IN)

(72) Inventors: Krishnam Raju Alamuri, Hyderabad (IN); Satish Raghavendran, Hyderabad (IN); Saurabh Mazumdar, New Delhi (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 238 days.

(21) Appl. No.: 17/471,477

(22) Filed: Sep. 10, 2021

(65) Prior Publication Data

US 2022/0083615 A1 Mar. 17, 2022

(30) Foreign Application Priority Data

Sep. 11, 2020 (IN) .............................. 202041039257

(51) Int. Cl.
*G06F 16/9535* (2019.01)
*G06F 16/9538* (2019.01)
*G06F 16/955* (2019.01)

(52) U.S. Cl.
CPC ...... *G06F 16/9535* (2019.01); *G06F 16/9538* (2019.01); *G06F 16/9566* (2019.01)

(58) Field of Classification Search
CPC .. G06F 16/951; G06F 16/953; G06F 16/9532; G06F 16/9535; G06F 16/9536; G06F 16/9538; G06F 16/9566
See application file for complete search history.

(56) References Cited

U.S. PATENT DOCUMENTS

| | | | |
|---|---|---|---|
| 7,860,222 B1 * | 12/2010 | Sidler | H04L 63/302 379/85 |
| 8,131,745 B1 * | 3/2012 | Hoffman | G06Q 10/107 707/766 |
| 10,394,900 B1 * | 8/2019 | Edwards | G06F 16/951 |
| 10,997,595 B1 * | 5/2021 | Gross | G06Q 20/4016 |
| 11,037,160 B1 * | 6/2021 | Kolls | G06Q 20/4016 |
| 2011/0307434 A1 * | 12/2011 | Rostampour | H04L 51/52 706/45 |

(Continued)

*Primary Examiner* — Kris E Mackes
(74) *Attorney, Agent, or Firm* — CANTOR COLBURN LLP

(57) ABSTRACT

A system and a method for automated data screening for background verification is provided. The invention provides for analyzing a first input file and a second input file. Data enrichment operation is performed on first input file and second input file based on captured client and CPs data from URLs which are extracted from open media sources or from data sources that organization has subscribed to obtain an enriched first input file and second input file. Matching operation is performed between enriched first input file and second input file. Adverse data is determined associated with clients and CPs data determined as true match and potential match in first input file and second input file. Further, extracted adverse data is cleaned and filtered to generate screened data associated with clients and the CPs data and generating output folder comprising output file including screened client and CPs and hit data.

11 Claims, 9 Drawing Sheets

(56) References Cited

U.S. PATENT DOCUMENTS

| | | | |
|---|---|---|---|
| 2015/0212997 A1* | 7/2015 | Kassim | G06Q 50/18 |
| | | | 715/226 |
| 2018/0150800 A1* | 5/2018 | Glavin | G06F 16/951 |
| 2018/0293681 A1* | 10/2018 | Larowe | G06Q 50/26 |
| 2019/0156291 A1* | 5/2019 | Nayak | G06Q 10/0635 |
| 2019/0325397 A1* | 10/2019 | Coats | G06Q 10/1053 |
| 2020/0082346 A1* | 3/2020 | Tandra | G06Q 10/1053 |
| 2021/0056554 A1* | 2/2021 | Muthu | G06Q 50/01 |

* cited by examiner

| | |
|---|---|
| Representative Name | Dave Mendez |
| Company Name | ABC Company Ltd |
| Hit Person | Dave Mendez |
| Comments | Name, Gender, DOB, Entity Matched |
| CP Enrichment values | MN: SHAWN, DOB: 1975, Gender: MALE |
| CP Enrichment Links | MN: Example1.com |
| Negative words | Disqualification |
| Adverse News | Debarred from Directorship |
| Summary | SEC Director's disqualification list in 2011 |
| Date(mm-dd-yyyy) | 01-16-2020 |
| Negative Sentiment Score % | 57% — Vader Sentimental Analyzer Score |
| Match Score % | 100% — CP and Hit File Match Confidence % |
| Web Match Score % | 100% — CP and Hit File Open Media Content Match Relevance % |
| Link | Sec.gov |
| Feedback | TRUE HIT |

FIG. 5

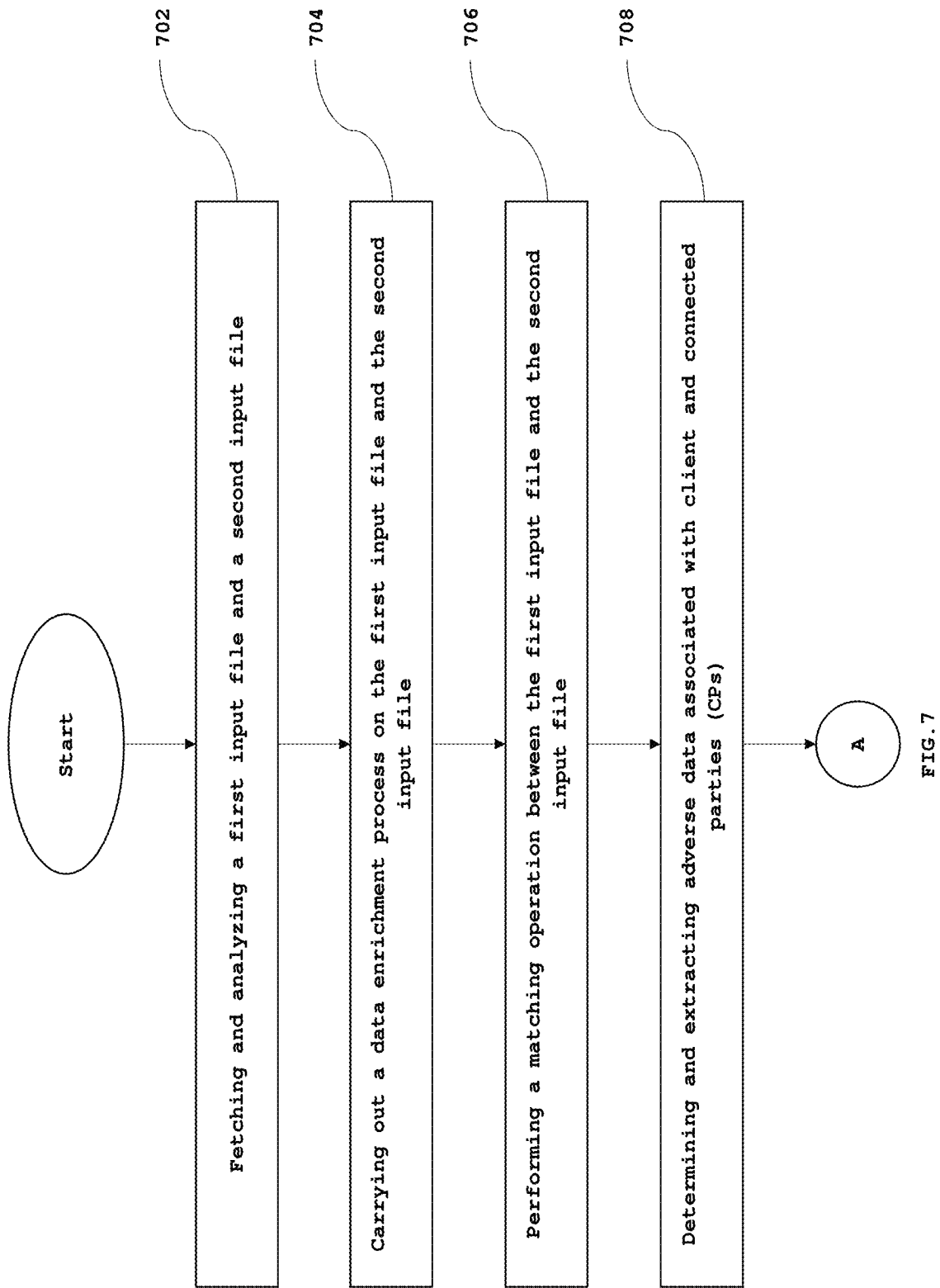

SYSTEM AND METHOD FOR AUTOMATED DATA SCREENING FOR BACKGROUND VERIFICATION

CROSS REFERENCE TO RELATED APPLICATION

This application is related to and claims the benefit of Indian Patent Application Number 202041039257 filed on Sep. 11, 2021, the contents of which are herein incorporated by reference in their entirety.

FIELD OF THE INVENTION

The present invention relates generally to the field of user profile creation and screening. More particularly, the present invention relates to a system and a method for automated cognitive based data screening for background verification for users and entities.

BACKGROUND OF THE INVENTION

Background Verification (BGV) of users (clients) of an organization also known as client list screening is the most critical stage in Know-Your-Client (KYC) process which every organization such as, banks, financial institutions, e-commerce organizations, etc., perform while on-boarding of new clients or during periodic refresh of data relating to existing and new clients. The BGV is performed in order to identify whether the new or existing clients and Connected Parties (CPs) related to clients are associated with any negative engagements, such as, but not limited to, if client is involved in any vulnerable activities and businesses, if the client has any ongoing cases relating to criminal or civil litigation, if client is operating business in sanctioned countries, if the client or its counterparties have connections with or are specially designated nationals, if the client or its counterparties have been involved in fraud or other related activities and if client is associated with any politically exposed persons. Further, the clients and any counter parties data is analyzed for any negative engagements through processing of data in various internal and external data sources and databases containing details of negative engagements globally for the clients and its CPs Typically, BGV is carried out in a manual manner in which one or more trained analysts in the organization collect client information for taking decisions on whether the client has any negative engagements or not, that may adversely affect the organization. It has been observed that manual BGV is a time intensive and an error prone process which inaccurately adjudicate the right risk rating and risk profile for organization. Additionally, manual processing of data in various internal and external data sources and databases may not accurately narrow down the results due to large volume of lexicons i.e. required keywords are not searched. Further, typically, the search results from the internal and external data sources and databases are manually combined for determining and matching the correct profile of the client and CPs for BGV, which is a labor intensive process and has a high propensity of error. Furthermore, the internal and external data sources and databases do not provide synthesized content for review and instead provide a list of matches which run into hundreds of pages which have to be manually segregated and sorted out for a refined view. Further, it is cumbersome to identify and classify the hit person with the CPs.

Yet further, existing BGV techniques usually classify client profile matches into one or more false positive matches. It has been observed that it is a challenge for all the organizations to classify the client profile accurately and correctly identify as false positive and true positive match. Traditionally, the classification of client's profile is done manually and the teams have to adjudicate high number of alerts in order to identify which is true positive and false positive match to ensure they do not miss highly suspicious clients and CPs profile. Also, it has been observed that 90% of the matches generated are false positives through internal and external databases and the organizations are spending over 70% of the BGV time and effort in classifying and resolving the matches for accurate classification and then put-in the findings for each connected party which is not only labor intensive and cost effective but also lacks efficiency, efficacy and accuracy.

It has become extremely challenging for analysts in organizations to carry out a comprehensive and rigorous search on various data sources for summarizing and interpreting the content for negative engagements of the clients and CPs. This may lead to a huge risk for organizations to overlook the relevant client and CPs data and may further poses a serious risk to reputation of the organization, which may result in fines and penalties on the organizations.

In light of the aforementioned drawbacks, there is a need for a system and a method which provides for automated data screening for background verification. Further, there is a need for a system and a method which provides for providing a holistic, accurate, updated, efficient, risk free and cost effective data screening for background verification.

SUMMARY OF THE INVENTION

In various embodiments of the present invention, a system for automated data screening for background verification is provided. the system comprises a memory storing program instructions, a processor executing instructions stored in the memory and a background verification engine executed by the processor and configured to analyze a first input file and a second input file. The first input file is representative of client data and Connected Parties (CPs) data and the second input file is representative of a hit file which provides hit details extracted from an internal database of an organization or from external data providers of the organization that are subscribed to by evaluating historical data. The background verification engine is further configured to perform a data enrichment operation on the first input file and the second input file based on captured client and CPs data from one or more Universal Resource Locators (URLs) which are extracted from one or more open media sources or from the data sources that the organization has subscribed to obtain an enriched first input file and second input file. One or more priority URLs are segregated from the extracted URLs for carrying out the data enrichment operation. The background verification engine is further configured to perform a matching operation between the enriched first input file and the second input file. Matched results of the first input file and the second input file are classified as a true match or a false match or a potential match. The background verification engine is further configured to determine adverse data associated with the clients and the CPs data determined as the true match and the potential match. A sentiment score is computed for each of the client and CPs data based on the extracted adverse data. The background verification engine is further configured to clean and filter the extracted adverse data to generate screened data associated with the clients and CPs data. Lastly, the background verification engine is configured to generate an output folder comprising an output file including the screened client and CPs data and hit data.

In various embodiments of the present invention, a method for automated data screening for background verification is provided. The method is implemented by a processor executing instructions stored in a memory. The method comprises analyzing a first input file and a second input file. The first input file is representative of client data and Connected Parties (CPs) data and the second input file is representative of a hit file which provides hit details extracted from an internal database of an organization or from external data providers of the organization that are subscribed to by evaluating historical data. The method further comprises performing a data enrichment operation on the first input file and the second input file based on captured client and CPs data from one or more Universal Resource Locators (URLs) which are extracted from one or more open media sources or from the data sources that the organization has subscribed to obtain an enriched first input file and second input file. One or more priority URLs are segregated from the extracted URLs for carrying out the data enrichment operation. The method further comprises performing a matching operation between the enriched first input file and the second input file. Matched results of the first input file and the second input file are classified as a true match or a false match or a potential match. The method further comprises determining adverse data associated with the clients and the CPs data determined as the true match and the potential match in the first input file and the second input file. A sentiment score is computed for each of the client and CPs data based on the extracted adverse data. The method further comprises cleaning and filtering the extracted adverse data to generate screened data associated with the clients and the CPs data. Lastly, the method comprises generating an output folder comprising an output file including the screened client and CPs data and hit data.

In various embodiments of the present invention, a computer program product is provided. The computer program product comprising a non-transitory computer-readable medium having computer program code store thereon, the computer-readable program code comprising instructions that, when executed by a processor, caused the processor to analyze a first input file and a second input file. The first input file is representative of client data and Connected Parties (CPs) data and the second input file is representative of a hit file which provides hit details extracted from an internal database of an organization or from external data providers of the organization that are subscribed to by evaluating historical data. Further, the processor is caused to perform a data enrichment operation on the first input file and the second input file based on captured client and CPs data from one or more Universal Resource Locators (URLs) which are extracted from one or more open media sources or from the data sources that the organization has subscribed to obtain an enriched first input file and second input file. One or more priority URLs are segregated from the extracted URLs for carrying out the data enrichment operation. Further, the processor is caused to perform a matching operation between the enriched first input file and the second input file. Matched results of the first input file and the second input file are classified as a true match or a false match or a potential match. Further, the processor is caused to determine adverse data associated with the clients and the CPs data determined as the true match and the potential match. A sentiment score is computed for each of the client and CPs data based on the extracted adverse data. Further, the processor is caused to clean and filter the extracted adverse data to generate screened data associated with the clients and CPs data and generate an output folder comprising an output file including the screened client and CPs data and hit data.

BRIEF DESCRIPTION OF THE ACCOMPANYING DRAWINGS

The present invention is described by way of embodiments illustrated in the accompanying drawings wherein:

FIG. 5 illustrates a screenshot of the actionable UI depicting the computed sentiment score for a client, in accordance with various embodiments of the present invention;

FIG. 7 and FIG. 7A illustrate a flowchart depicting a method for automated data screening for background verification, in accordance with various embodiments of the present invention.

DETAILED DESCRIPTION OF THE INVENTION

The present invention discloses a system and a method which provides for automated data screening for background verification (BGV). In particular, the present invention provides for a system and a method for end-to end automated user (i.e. client of an organization) data screening for background verification prior to on-boarding or during a periodic review or trigger based review or perpetual Know Your Customer (KYC) of the client in an organization based on cognitive techniques such as, but are not limited to, machine learning and artificial intelligence. The present invention provides for a system and a method for automated and integrated client screening by enriching, synthesizing, reviewing, validating and adjudicating the data of the clients and connected parties (CPs) and further screening for negative engagements of the clients and CPs through web-scraping. Further, the present invention provides for a system and a method for efficient processing of data in various internal and external data sources and databases containing negative engagements globally of the clients and CPs. Furthermore, the present invention provides for a system and a method for accurate, updated, efficient, cost effective and end-to-end client data screening for background verification providing a documented audit trail for internal and external regulatory reviews. Yet further, the present invention provides for an actionable User Interface (UI) for appropriate visualization of client and CPs data for background verification and related metrics providing actionable insights to improve and optimize the BGV process and further to aid the organization to effectively identify the right risk profile of the clients and thereby adjust the client base to implement a more cost effective onboarding and review process.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
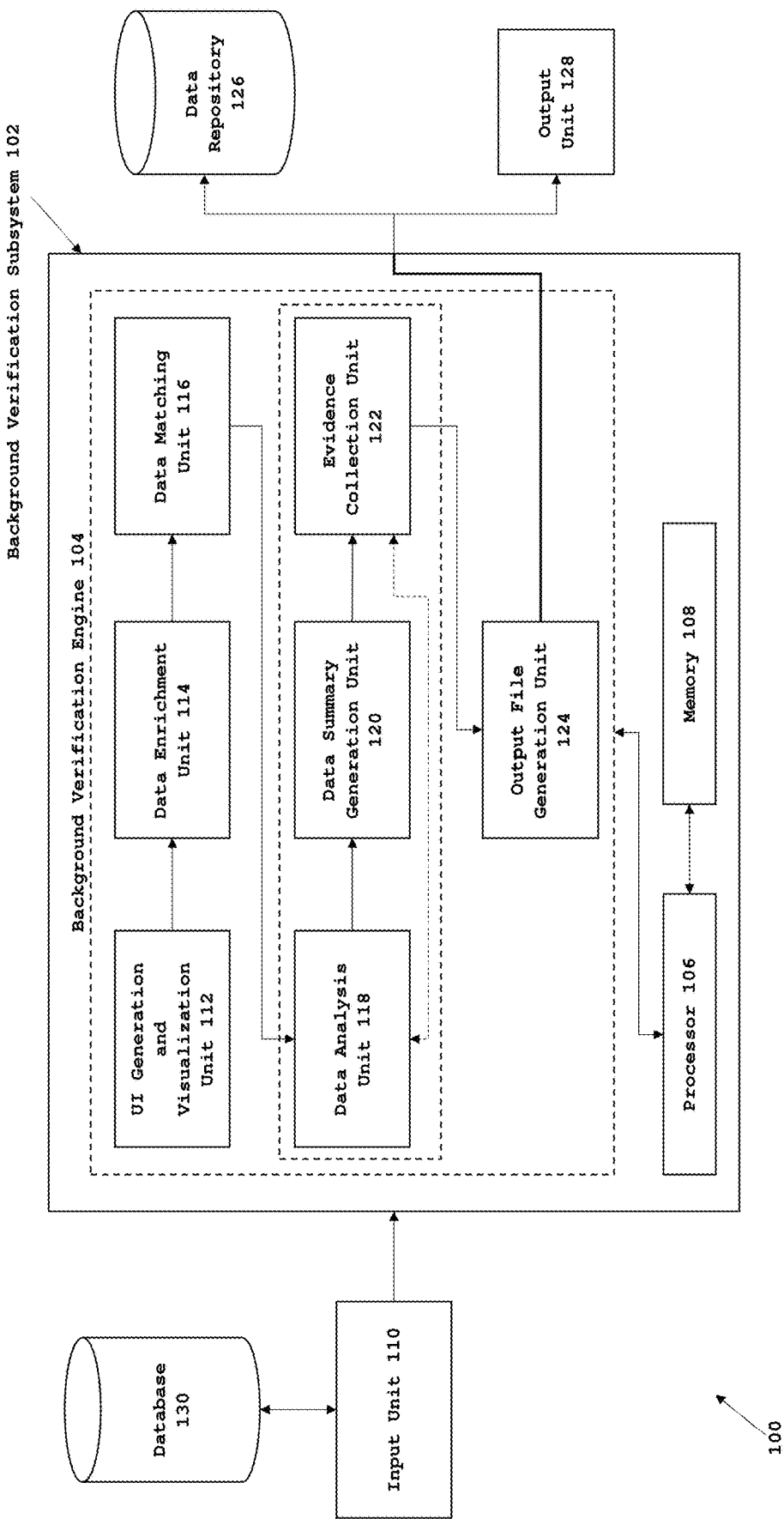
FIG. 1 is a detailed block diagram of a system for automated data screening for background verification, in accordance with various embodiments of the present invention.

FIG. 1 is a detailed block diagram of a system 100 for automated data screening for background verification, in accordance with various embodiments of the present invention. Referring to FIG. 1, in an embodiment of the present invention, the system 100 comprises a background verification subsystem 102, a database 130, an input unit 110, a data repository 126 and an output unit 128. The input unit 110, the data repository 126 and the output unit 128 are connected to the subsystem 102 via a communication channel (not shown). The communication channel (not shown) may include, but is not limited to, a physical transmission medium, such as, a wire, or a logical connection over a multiplexed medium, such as, a radio channel in telecommunications and computer networking. The examples of radio channel in telecommunications and computer networking may include, but are not limited to, a local area network (LAN), a metropolitan area network (MAN) and a wide area network (WAN).

The subsystem 102 is configured with built-in-intelligent mechanism for carrying out automated user (i.e. client) data screening for background verification. The subsystem 102 is a self-optimizing and self-learning system. The subsystem 102 is an integrated decision-automation system, which enriches, reviews and validates the details of clients and connected parties (CPs) for client data screening and carrying out background verification. The subsystem 102 may use one or more cognitive techniques for carrying out automated user data screening for background verification. The cognitive techniques used may include, but are not limited to, machine learning techniques and artificial intelligence techniques.

In an embodiment of the present invention, the subsystem 102 comprises a background verification engine 104 (the engine 104), a processor 106 and a memory 108. In various embodiments of the present invention, the engine 104 has multiple units which work in conjunction with each other for carrying out automated user data screening for background verification. The various units of the engine 104 are operated via the processor 106 specifically programmed to execute instructions stored in the memory 108 for executing respective functionalities of the units of the engine 104 in accordance with various embodiments of the present invention.

In another embodiment of the present invention, the subsystem 102 may be implemented on-premises or in a cloud computing architecture in which data, applications, services, and other resources are stored and delivered through shared data-centers. In an exemplary embodiment of the present invention, the functionalities of the subsystem 102 are delivered to a user as Software as a Service (SaaS) or a Platform as a Service (Paas) over a communication network.

In an embodiment of the present invention, the subsystem 102 may be installed at an organization's end and operated by an analyst in the organization. The subsystem 102 may be installed and operated in electronic devices such as a computer system, a laptop, a tablet or a smartphone. Further, the installation and operation of the subsystem 102 is carried out based on a computer programing language based virtual environment such as, but not limited to, python virtual environment and Natural Language Programming (NLP) package. The NLP packages includes, but are not limited to, Natural Language Toolkit (NLTK), spaCy, Stanford Named Entity Recognizer (NER) tagger, Valence Aware Dictionary and Sentiment Reasoner (VADER) and newspaper library. In an exemplary embodiment of the present invention, selenium chrome driver and Stanford Java Archives (JAR) files are employed for installation and operation of the subsystem 102 at the organization's end. The selenium chrome driver is a 'sandbox' web scraper that leverages chrome driver to access websites. Further, the subsystem 102 is connected to one or more databases 130 via the input unit 110 based on the organization's needs and requirements. The databases 130 may operate on at least, but not limited to, MySQL service, Oracle DB, MS SQL, Postgre SQL and Big Data storage (e.g. Hadoop, Spark, NoSQL, etc.). The database 130 may comprise client data and CPs data.

In an embodiment of the present invention, the engine 104 comprises a User Interface (UI) generation and visualization unit 112, a data enrichment unit 114, a data matching unit 116, a data analysis unit 118, a data summary generation unit 120, an evidence collection unit 122 and an output file generation unit 124.

In operation, in an embodiment of the present invention, the UI generation and visualization unit 112 is configured to generate and render an actionable UI on the input unit 110 for capturing inputs associated with client and CPs data screening for background verification. The analyst in the organization may access and login to the actionable UI based on his/her ID credentials using a Single Sign-On (SSO). Further, the inputs associated with the client data and CPs data are provided, via the actionable UI, to the subsystem 102. In an exemplary embodiment of the present invention, the CPs data may include, but is not limited to, data related to an individual person and a company or entity associated with the client. In an embodiment of the present invention, the inputs are provided to the subsystem 102 as a first input file and a second input file and are stored in a standard directory associated with the subsystem 102. The first input file and the second input file may be in a digital file format such as, but not limited to, xls, txt and APIs. The first input file is representative of the client data and CPs data which provides data of the clients and CPs undergoing background verification process, as illustrated in Table 1.

Further, the second input file is representative of a hit file (from various data sources and data providers) which provides hit details extracted from an internal database (not shown) of the organization or from external data providers of the organization that are subscribed to by evaluating historical data such as, but is not limited to, annual reports, exhibit 21, affiliation/subsidiary list, various third party data sources and reports, internal and supplementary external sources for hits and an enquiry file, as illustrated in Table 2.

TABLE 1

| Column Name | Description | Example | Mandatory Field (CP as Individual) | Mandatory Field (CP as Entity) |
| --- | --- | --- | --- | --- |
| Client ID | A unique number for every client | 12345 | Yes | Yes |
| Client Name | Entity or Company name where CP presently works. | Cognizant Solutions Pvt. Ltd. | Yes | Yes |
| Category | Designation of Client in the company | Board of Director/ RBO, D2D Controller, etc. | No | No |
| Full Name | Full Name of CP | David Anne Johnson | Yes | Yes |
| First Name | CP First Name | David | Yes | No |
| Middle Name | CP Middle Name | Anne | No | No |
| Last Name | CP Last Name | Johnson | Yes | No |
| Alias Name | Alias name of the CP | Johnny | No | No |
| DOB | Date of Birth of CP | Oct. 12, 1955 | No | No |
| Nationality | Nationality of CP | United States | No | No |
| Domicile | Current residential status of CP | India | No | No |
| Gender | Gender of CP | Male | No | No |

TABLE 2

| Column Name | Description | Example | Mandatory (CP as Individual) | Mandatory (CP as Entity) |
| --- | --- | --- | --- | --- |
| Input Legal | Entity Name for which BGC should be done (CP as Entity) | | No | Yes |
| Given Name | First name of the Hit person | Michael | Yes | No |
| Family Name | Last name of the Hit Person | Barnes | Yes | No |
| HRN ID New | It is a Foreign key to join Entity File entries with Hit file entries. | 123890 | Yes | Yes |
| Difference on account of | | Incremental HIT-NEW HRN ID Created | Yes | No |
| Qualification | Qualification of Hit | | No | No |
| First Name | First name of the Hit person | Michael | Yes | No |
| Middle Name | Middle name of the Hit person | Fishbein | No | No |
| Last name | Last name of the Hit person | Barnes | Yes | No |
| DOB | Date of Birth of the Hit person | Jan. 1, 1970 | No | No |
| Nationality | Nationality of the Hit person (Birth place of the Hit Person) | United States | No | No |
| Address Country | Country where Hit person is currently residing | United Kingdom | No | No |
| Gender | Gender of Hit person | Male/Female/ Andy | No | No |
| HRN Category | Risk category under which Hit person is locked under | PEP, Serious Claims | Yes | No |
| Internal database profile (Factiva// RDC, WC, Lexis Nexis) | Information about the Hit person | FINRA Notes: Individuals barred or suspended Michael Barnes from the association and was fined 7,500$ with any NASD member in any capacity for 3 months | No | Yes |
| Internal database profile (Factiva// RDC, WC, Lexis Nexis) | Source from which the news about the Hit person taken | FINRA | No | No |
| URL | URL of the Hit person news if available | http://www. finra.org/ web/groups/ industry/ | No | No |

In an embodiment of the present invention, the first input file and the second input file are selected and fetched on the actionable UI from the standard directory. Further, a run solution option is selected on the actionable UI for analyzing the first input file and the second input file by the subsystem 102 and subsequently a pop up on the actionable UI is rendered which shows the progress of the analysis process. After the analysis process is completed, a dialogue box pops up on the actionable UI with the message 'task completed'. Subsequently, a 'generate excel' option is selected on the actionable UI to generate a consolidated output in an MS Excel sheet comprising the first input file and the second input file which is displayed and visualized on the actionable UI.

In another embodiment of the present invention, the subsystem 102 is configured to carry out a batch analysis of the first input file and the second input file on the actionable UI, in which multiple first input files and the second input files are analyzed at the same time. The first input file and the second input file associated with an individual client and CPs is analyzed at a time and the subsystem 102 creates an individual output folder with client id and timestamp. Further, the subsystem 102 generates an excel file with client ID and timestamp in the output folder and writes the output information into the excel file. In an exemplary embodiment of the present invention, in order to cause the subsystem 102 to execute the batch analysis process, the batch analysis tab is selected on the actionable UI and a folder comprising all the first input files and the second input files associated with different clients are fetched from the standard directory for carrying out the batch analysis process. Further, the first input files and the second input files are mapped with each other using the client ID mentioned in their file name.

In an embodiment of the present invention, the data enrichment unit 114 is configured to receive the first input file and the second input file from the UI generation and visualization unit 112 for carrying out a data enrichment operation on the first input file and the second input file. The data enrichment operation comprises updating any missing client and the CPs data and company/entity data in the first input file and the hit details in the second input file based on extracted data from one or more open media sources or carrying out a contextual web search by the data enrichment unit 114. The extraction of data from the media sources and the web based search is carried out using techniques such as, but are not limited to, a NLP search, a speech recognition technique, a phonetic finger printing technique, a content understanding technique, an image recognition technique and a sentiment analysis technique. The client and CPs data in the first input file, as provided in Table 1, includes, but are not limited to, middle name, date of birth, gender and nationality of the client and the CPs. The hit details in the second input file relates to individual or company/entity details associated with the client and the CPs. Further, the enriched client and CPs data is stored in the database 130. In an embodiment of the present invention, the data enrichment operation may be auto-scheduled for execution at a pre-defined time period, without any manual intervention, and the database 130 is updated with the enriched client and CPs data.

In operation, in an embodiment of the present invention, the data enrichment unit 114 is configured to perform the data enrichment operation based on analyzing the first input file and the second input file for any missing data related to client and CPs and individual or company/entity data associated with the client and the CPs respectively. The data enrichment unit 114 is configured to extract one or more Universal Resource Locators (URLs) (e.g. 20 URLs) from the open media sources based on a search query for capturing client and CPs data and carrying out the data enrichment operation. The search query may include, but is not limited to, 'full name of client and CPs and entity'. The data enrichment may further be carried out from the data sources that the organization has subscribed to. The data enrichment unit 114 thereafter segregates one or more priority URLs from the extracted URLs. The priority URLs relates to the most relevant ULRs such as, but are not limited to, zoom-info.com/directory/person/, marketscreener.com/business-leaders, crunchbase.com/person/, etc. The URLs are directly extracted without using NLP or by partially using NLP. In an exemplary embodiment of the present invention, the data enrichment unit 114 is configured to extract gender of the client and CPs from the priority URLs. In the event gender information is not available in the URLs, then the data enrichment unit 114 is configured to use a 'gender guesser' library to determine the gender from the name of the client and the CPs. In another exemplary embodiment of the present invention, the data enrichment unit 114 may extract client, CPs and entity data from one or more non-priority ULRs. The data enrichment unit 114 is configured to determine if the clients and CPs name and entity exists in the non-priority URL text. Further, the data enrichment unit 114 is configured to deploy regular expressions from the non-priority URLs to match the client and CPs data (e.g. age, nationality, etc.) and entity data, and to extract the client, CPs data and entity data. Further, the data enrichment unit 114 is configured to utilize at least a named entity recognition technique to extract one or more past entities data. In an exemplary embodiment of the present invention, the data enrichment unit 114 uses a combination of spaCy and NLTK libraries to discard irrelevant entities data. In a scenario, if no client, CPs data and entity data are extracted from open media sources then an empty entry is created in the first input file and the second input file respectively, with only a primary key relating to the existing client, CPs data and entity data.

Figure 2:
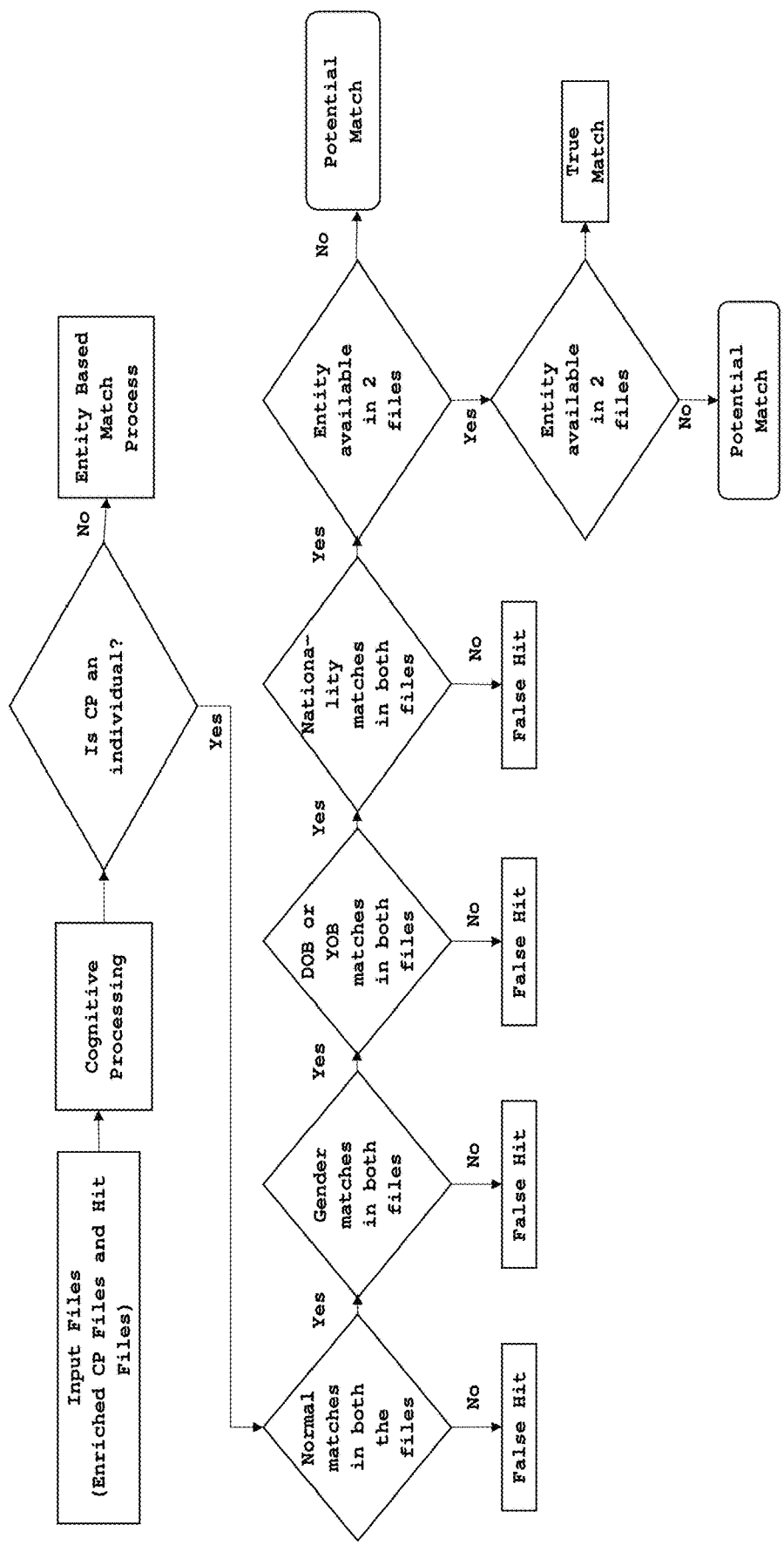
FIG. 2 illustrates a flowchart depicting a matching operation between a first input file and a second input file, if a connected party (CP) is an individual person, in accordance with various embodiments of the present invention.
Figure 3:
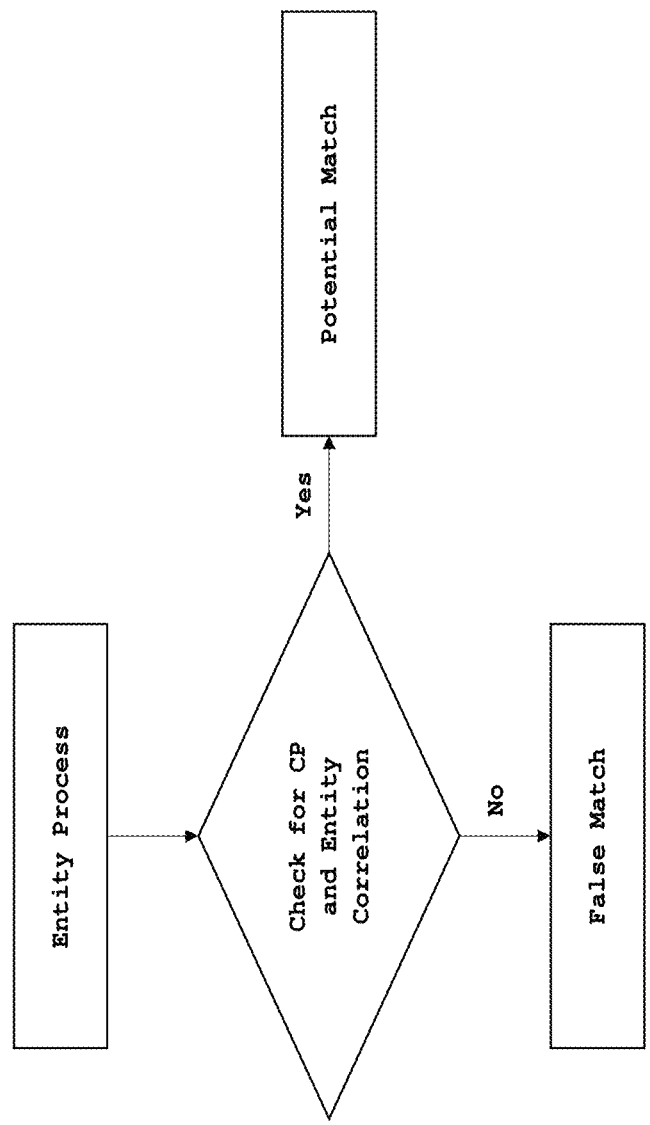
FIG. 3 illustrates a flowchart depicting a matching operation between a first input file and a second input file, if a CP is a company or an entity, in accordance with various embodiments of the present invention.

In an embodiment of the present invention, the data matching unit 116 is configured to receive the enriched first input file and the second input file for performing a matching operation between the enriched the first input file and the second input file. The matching operation between the first input file and the second input file relates to matching of client's and CPs attributes such as, but are not limited to, names, date of birth, gender, nationality, if the CPs is an individual person. Further, if the CPs is a company or an entity, then a separate entity based matching process is carried out. In the event the CPs is an individual person, the matching operation between the first input file and the second input file is illustrated in a flow chart as shown in FIG. 2, in accordance with an embodiment of the present invention. In the event, the CPs is a company or an entity, the matching operation between the first input file and the second input file is illustrated in a flow chart as shown in FIG. 3, in accordance with another exemplary embodiment of the present invention. Further, the data matching unit 116 is configured to classify the matching results of the first input file and the second input file as a true match, a false match and a potential match, as illustrated in Table 3 herein below. Further, classifying the match as the true match, the false match and the potential match aids in providing accurate results.

TABLE 3

| Name | Gender | DOB/YOB | Nationality | Entity | Result |
|---|---|---|---|---|---|
| True | True | True | True | True | True Match |
| True | True | True | True | False | Potential Match |
| True | True | True | True | NA | Potential Match |
| True | True | True | NA | NA | Potential Match |
| True | True | NA | NA | NA | Potential Match |

TABLE 3-continued

| Name | Gender | DOB/YOB | Nationality | Entity | Result |
|---|---|---|---|---|---|
| True | NA | NA | NA | NA | Potential Match |
| True | NA | NA | NA | True | Potential Match |
| True | NA | NA | True | True | Potential Match |
| True | NA | NA | True | NA | Potential Match |
| True | NA | True | NA | True | Potential Match |
| True | NA | True | True | True | Potential Match |
| True | NA | True | True | NA | Potential Match |
| True | True | NA | NA | True | Potential Match |
| True | True | NA | NA | NA | Potential Match |
| True | True | NA | True | True | Potential Match |
| True | True | NA | True | NA | Potential Match |
| True | True | True | NA | True | Potential Match |
| True | True | True | NA | NA | Potential Match |
| True | True | True | False | | False Match |
| True | True | False | | | False Match |
| True | False | | | | False Match |
| False | | | | | False Match |

In an embodiment of the present invention, the data matching unit 116 performs a hierarchical matching operation of client and CPs attributes between the first input file and the second input file in the event the CP is an individual person, as illustrated in FIG. 2. The client and CPs attributes used for matching the first input file and the second input file includes, but are not limited to, a first name, a middle name (if present), a last name, date or year of birth, gender, nationality and entity matching. Further, as illustrated in FIG. 2, a 'yes' is determined for a successful matching operation of the client and CPs attributes between the first input file and the second input file and determined as the true match by the data matching unit 116, if the client and CPs attributes data is identical between the first input file and the second input file. Further, the 'yes' is also determined for missing client and CPs attributes between the first input file and the second input file despite carrying out the web search. Further, as illustrated in FIG. 2, a 'no' is determined for an unsuccessful matching operation of the client and CPs attributes between the first input file and the second input file and determined as the false match by the data matching unit 116, in the event the client and CPs attributes data are not identical in the first input file and the second input file. Further, if the client and CPs attributes is missing or not determinable between the first input file and the second input file then the match between the first input file and the second input file is determined as the potential match by the data matching unit 116. Further, a feedback loop is applied on the potential matches by the data matching unit 116 using an evolutionary learning technique for reinforcing learning and improving accuracy of matching outputs and further generating new scenarios for continuously enriching the data repository 126.

Figure 4:
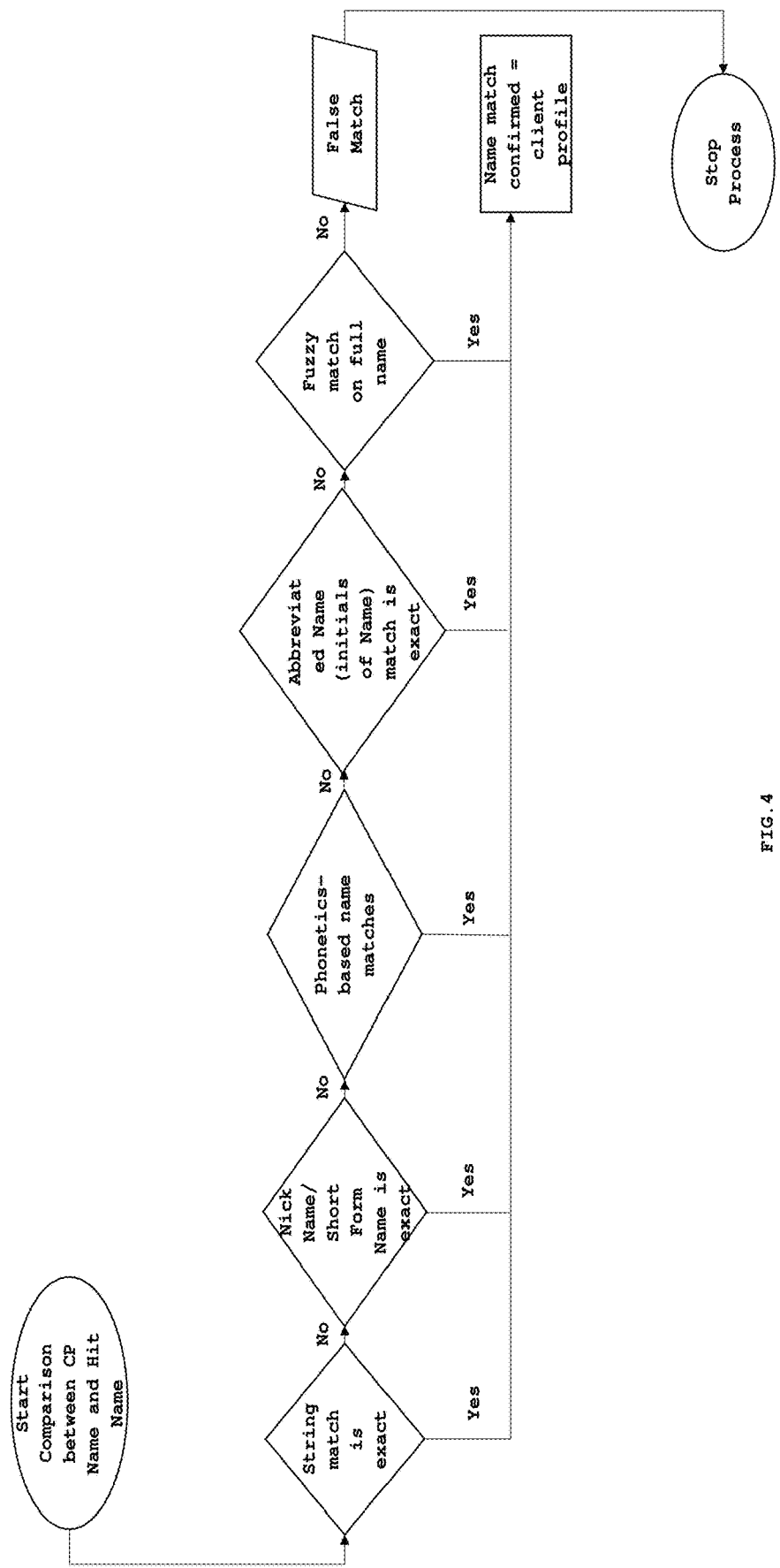
FIG. 4 illustrates a flowchart depicting application of one or more name matching techniques for matching a clients and CPs name attribute in the first input file and the second input file, in accordance with various embodiments of the present invention.

In an embodiment of the present invention, the data matching unit 116 is configured to apply one or more cognitive techniques for matching client and CPs attributes between the first input file and the second input file. In an exemplary embodiment of the present invention, the data matching unit 116 is configured to apply one or more name matching techniques for matching clients and CPs name attributes in the first input file and the second input file, as illustrated in a flowchart in FIG. 4. The one or more name matching techniques include, but are not limited to, a direct string match technique, a short name match technique, a phonetic match technique, an abbreviated name match technique, a fuzzy match technique and a combination thereof. In an example, as illustrated in FIG. 4, the direct string match technique is employed to check if the client and CPs names in the first input file and the second input file are an exact match (e.g. Alexander Robert=Alexander Robert). The short name match technique is employed to check if the client and CPs nick names in the first input file and the second input file are exactly matched (e.g. Alexander Robert=Alex Robert). Further, the phonetic match technique is employed to check if the client and CPs phonetic names in the first input file and the second input file are exactly matched (e.g. Anna Fox=Ana Fox, Stephen Levy=Stephen Levie). The abbreviated name match technique is employed to check if the client and CPs abbreviated names in the first input file and the second input file are exactly matched (e.g. Robert H. Smith=R. Hallow Smith=Robert Hallow S. Lastly, the fuzzy match technique is employed to check if the client and CPs reordered first, middle and last names in the first input file and the second input file are exactly matched (e.g. Robert H. Swan=H. Robert Swan). In another exemplary embodiment of the present invention, the data matching unit 116 is configured to match clients and CPs date of birth and year of birth attributes in the first input file and the second input file based on applying a cutoff value of ±3 years. In yet another exemplary embodiment of the present invention, the data matching unit 116 is configured to match other attributes (such as, gender and nationality) of the clients and CPs in the first input file and the second input file based on employing an exact matching technique.

In an embodiment of the present invention, the data matching unit 116 performs the matching operation by applying one or more cognitive techniques of matching client and CPs attributes between the first input file and the second input file in the event the CP is a company or an entity, as illustrated in FIG. 3. The cognitive techniques include, but are not limited to, direct string match, fuzzy match and list match. Further, the data matching unit 116 is configured to determine an association between two entities. For example, two entities may be determined as subsidiary of a parent entity, an entity 1 is determined as a subsidiary of an entity 2 and an entity 1 may have been renamed to an entity 2. In an embodiment of the present invention, as illustrated in FIG. 3, if there is a correlation between the CPs and the entity present in the first input file and the second input file, then the match is determined as the potential match. Further, in the event no correlation is determined between the CPs and the entity present in the first input file and the second input file, then the match is identified as the false match. Further, if second input file has one or more negative phrases such as, but are not limited to, bogus entity, unauthorized firm, clone entity and clone firm, then the match is identified as the false match.

In an embodiment of the present invention, the data analysis unit 118 is configured to determine adverse data for the clients and the CPs attributes and entities determined as the true match and potential match in the first input file and the second input file. The adverse data represents negative news and opinions associated with client and CPs. In an embodiment of the present invention, the adverse data relating to the client, CPs and entities is extracted by the data analysis unit 118 from the web sources by deploying a dynamic catalogue of pre-defined number of adverse keywords (e.g. 105 or more adverse keywords along with synonyms) stored in the data repository 126. The adverse keywords may include, but are not limited to, bribery, imprisonment, money laundering, sanctions and tax evasion. Further, the entire dynamic catalogue of the adverse keywords is deployed as a single search string, instead of deploying in the form of a sequence. The adverse data from the web may be extracted from social media, blogs, videos, news websites, etc. Furthermore, the data analysis unit 118 is configured to store the URL links on the web sources associated with the adverse data in the data repository 126 for future use.

In an exemplary embodiment of the present invention, at least three combinations of client, CPs and entity data are used by the data analysis unit 118 as search queries for extracting adverse data associated with the client, CPs and entities from the web source. The three combinations may include, CP full name and entity first word, CP first name, CP last name and entity first word and CP last name, CP first name and entity first word. Further, if a minimum of two or more words from the dynamic catalog of the adverse keywords are found in the data associated with the client, CPs and entities then the data is determined as adverse data from the most relevant five web pages on the web source.

In an embodiment of the present invention, the data analysis unit 118 is configured to apply at least a text-summation technique and a sentiment analyzer technique such as, but is not limited to, a VADER sentiment analyzer technique for analyzing severity of the adverse data associated with the clients, CPs and entities on the web source. Further, the VADER sentiment analyzer technique computationally determines whether the data on the web source is positive, adverse or neutral. Advantageously, the data analysis unit 118 is configured to analyze a sentence on the web source as a whole for determining whether the sentence is positive, adverse or neutral and does not determine the sentence as positive, adverse or neutral based on the words present in the sentence. Further, the data analysis unit 118 is configured to compute a sentiment score for each client, CPs and entities based on the extracted adverse data. FIG. 5 illustrates a screenshot of the actionable UI depicting the computed sentiment score for a client. The computed sentiment score is used to rank the extracted adverse data based on severity of the adverse data such that the adverse data having maximum score is ranked first and the adverse data having the minimum score is ranked last. The sentiment score indicates relevance of the URL links on the web sources from which adverse data was extracted. Further, the sentiment score is used by the data analysis unit 118 to determine a percentage match between the client, CPs and entities and the hit file. In an embodiment of the present invention, the data summary generation unit 120 is configured to generate a summary of the extracted adverse data by using a newspaper library to summarize the adverse data from the URLs on the web sources.

In an embodiment of the present invention, the evidence collection unit 122 is configured to analyze the extracted adverse data associated with the client, CPs and entities in communication with the data analysis unit 118 for cleaning and filtering the extracted adverse data associated with the clients, the CPs and entities. The cleaning and filtering of the extracted adverse data includes, but not is limited to, removing Hypertext Markup Language (HTML) headers, script headers, footers and other unwanted source information. The evidence collection unit 122 is configured to further process the cleaned and filtered adverse data by passing through a filter present in the evidence collection unit 122, which searches for various combinations of the first name, middle name (if present) and the last name of the client and CPs in the adverse data. Further, if the combination of first name, middle name (if present) and the last name of the client and CPs in the adverse data is present, then the evidence collection unit 122 extracts a pre-defined number of data characters (e.g. 3000 data characters) starting from the point where this combination is present in the adverse data. The pre-defined number of data characters extracted is referred to as text filtered in the source. Further, the evidence collection unit 122 is configured to use the spaCy and NER techniques on extracted data characters to extract the names of the entities related to the client and CPs.

In an embodiment of the present invention, the evidence collection unit 122 is configured to match the names of the entities with one or more Political Exposed People (PEP) keys present in an excel file stored in the database 130. Further, if a match is determined between the entities names and the one or more PEP keys, then the match is determined as a PEP information and the various PEP related columns of the output file are populated, as illustrated in Table 4. Further, if a match is not determined between the entities names and the PEP keys, then the entities names are matched with the pre-defined number of data characters directly. Further, if the entities names match with the pre-defined number of data characters then match is determined as the PEP information and the various PEP related columns of the output file are populated. In an exemplary embodiment of the present invention, the determined PEP information is populated in three columns, i.e. PEP keyword, PEP info and PEP URL, in the output file, as explained later in the specification. The PEP keyword represents PEP keys determined from the data present in the adverse data. PEP info represents portion of the adverse data in which the PEP keys are determined. PEP URL represents URL evidencing PEP info. Further, if no PEP information is determined for the client and CPs then all the three columns in the output file are populated with the text 'not applicable'.

Figure 6:
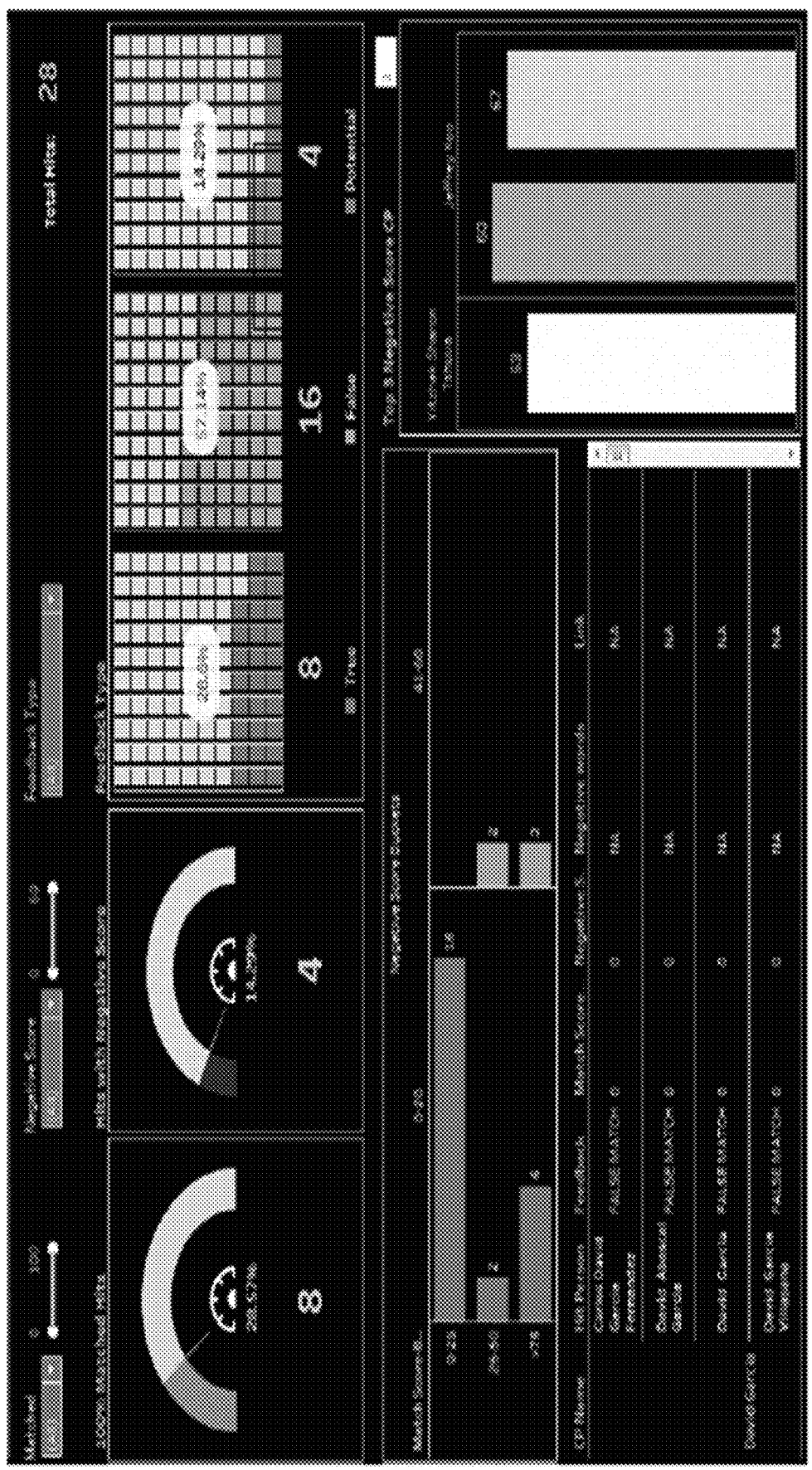
FIG. 6 illustrates a screenshot of the actionable UI depicting a dashboard built using the MS Excel file format output, in accordance with various embodiments of the present invention.

In an embodiment of the present invention, the output file generation unit 124 is configured to receive the inputs from the data analysis unit 118, the data summary generation unit 120 and the evidence collection unit 122 for generating an output folder associated with client and CPs ID and a timestamp. The output folder comprises the output file in an MS excel file format, as illustrated in Table 4. The output file includes two tables in a single file sheet comprising client, CPs and entities data and hit data with summary. In an embodiment of the present invention, the output file may be visualized via the output unit 128 on the actionable UI. The output unit 128 may include, but is not limited to, a computer, a laptop, a tablet and a smartphone. Further, the generated output file is stored in the data repository 126 for future retrieval. FIG. 6 illustrates a screenshot of the actionable UI depicting a dashboard built using the MS Excel file format output.

TABLE 4

| Column Name | Description |
| --- | --- |
| CE Number | Client Entity number, which is unique for each client. |
| Client entity name | Present/past organization of the client |
| CP Name | Name of the Individual or connected party |
| DOB | Date of Birth of the connected party |
| Nationality | Nationality of the connected party |
| Gender | Gender of connected party |
| Associated Entities | Any other companies which CP is associated with |
| CP Enriched values | Enriched values of the CP like DOB, Middle name, etc. |
| CP enrichment links | URLs from where the enriched values are extracted. |
| Total | Total number of match of the client |
| TRUE | Out of total number of Hits what is the total number of TRUE match |
| FALSE | Out of total number of Hits what is the total number of FALSE match |
| POTENTIAL | Out of total number of Hits what is the total number of POTENTIAL match |
| CP Name | Name of the Individual/Connected party |
| HRN ID | Unique ID for Hit identification in the database |
| HRN Category | Risk category under Hit person is locked under, ex., PEP, Serious claims, etc. |
| Hit Name | Name of Hit person matched from the R/Enquiry file |
| DOB | Date Of Birth of the Hit person |
| Nationality | Nationality of the Hit person |
| Gender | Gender of the Hit person |
| Associated Entities | Companies which Hit person is associated with current or later |
| Hit Enriched values | Enriched values of the Hit person, if made any like DOB, Gender, Middle name, etc. |
| Comments | It contains information of what are all the variables matched, ex., First name match, Last name match, gender match, etc. |
| Feedback | It says what match we have between the Hit person and connected party. Example-TRUE Match, FALSE Match, POTENTIAL Match. |
| Negative Score % | This is the negative sentiment score of the adverse news found in the link, calculated using VADER sentiment analyzer algorithm. VADER not only tells about the Positivity and Negativity score but also tells us about how positive or negative a sentiment is. |
| Match Score % | If the feedback column has a False Match for a particular CP then the score is 0<br>If the feedback column has a Potential Match for a particular CP then the score is 50<br>If the feedback column has a True Match for a particular CP then the score is 100 |
| Web Match Score % | If System is able to find CP name and Entity name extracted from the content of the URL, then the result will be 100%, else 0 |
| Links | Links evidencing Adverse news |
| Unprocessed Links | Unprocessed links are those URLs produced due to forbidden access by bots (tobots.txt) while web crawling. These links provide a message to enable JavaScript, which on manual intervention can be web scrapped. |
| Negative words | Negative keywords present in the Adverse news |
| Adverse News Summary | Extracted news containing negative keywords<br>Brief summary of the content in the URLs |
| PEP Keywords | PEP keywords matching from provided lexicon file |
| PEP Info | Text containing PEP keywords |
| PEP URL | Links evidencing PEP |
| Processed Date | Date and time the processed executed to compare CP and Hit details |

Figure 7A:
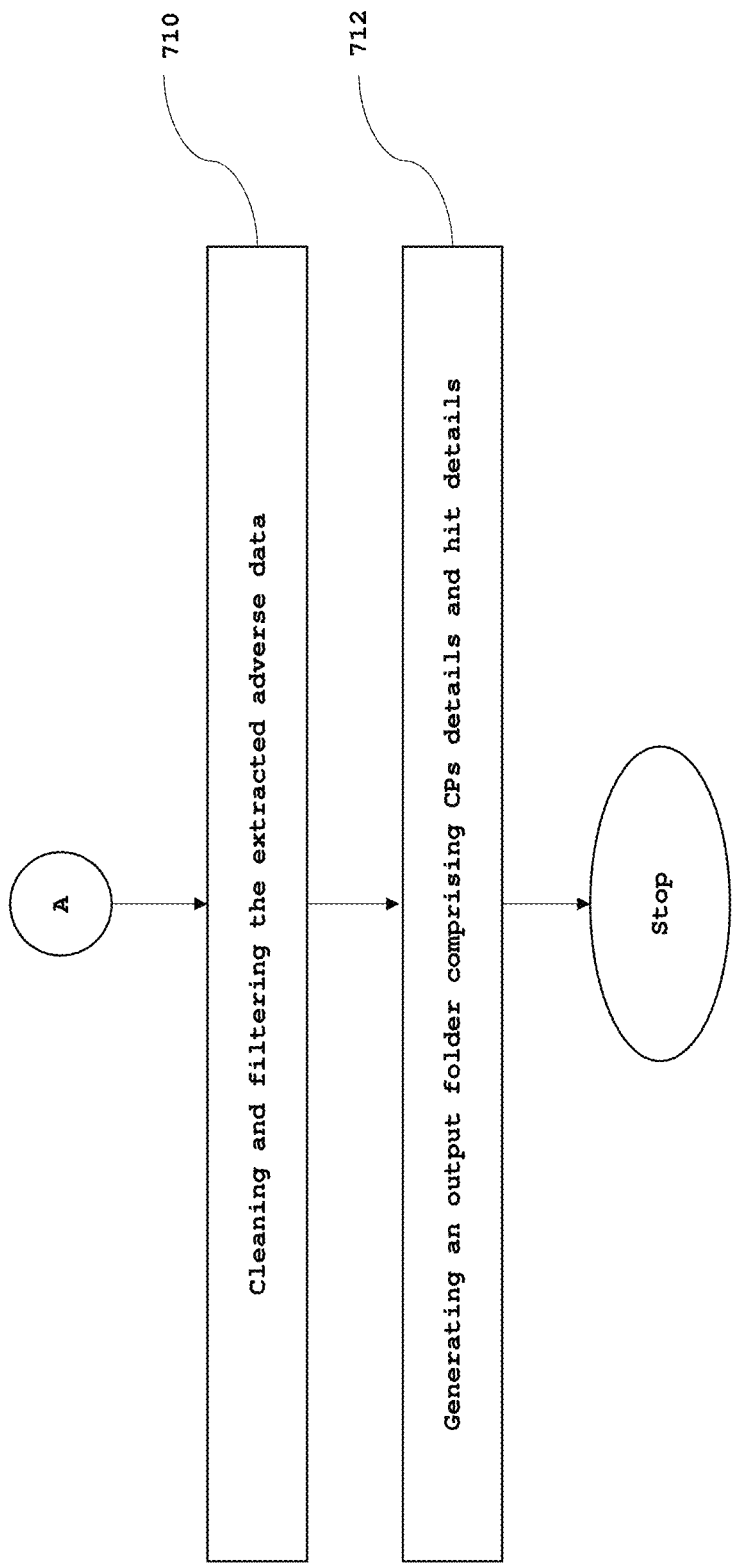

FIG. 7 and FIG. 7A illustrate a flowchart depicting a method for automated data screening for background verification, in accordance with various embodiments of the present invention.

At step 702, a first input file and a second input file is fetched and analyzed. In an embodiment of the present invention, an actionable UI is generated and rendered for capturing inputs from analysts in the organizations. The inputs are associated with client and CPs data screening for background verification. The analyst in the organization may access and login to the actionable UI based on his/her ID credentials using a Single Sign-On (SSO). In an exemplary embodiment of the present invention, the CPs data may include, but are not limited to, data related to an individual person and a company or entity associated with the client. In an embodiment of the present invention, the inputs are provided as a first input file and a second input file and are stored in a standard directory. The first input file is representative of the client and CPs data which provides data of the clients and CPs undergoing background verification process, as illustrated in Table 1. Further, the second input file is representative of a hit file which provides hit details extracted from an internal database of the organization or from external data providers of the organization that are subscribed to by evaluating historical data such as, but is not limited to, annual reports, exhibit 21, affiliation/subsidiary list, various third party data sources and reports, internal and supplementary external sources for hits and an enquiry file, as illustrated in Table 2.

In an embodiment of the present invention, the first input file and the second input file are selected and fetched via the actionable UI from the standard directory. Further, a run solution option is selected on the actionable UI for analyzing the first input file and the second input file and subsequently a pop up on the actionable UI is rendered which shows the progress of the analysis process. After the analysis process is complete, a dialogue box pops up on the actionable UI with the message 'task completed'.

Subsequently, a 'generate excel' option is selected on the actionable UI to generate a consolidated output in an MS Excel sheet comprising the first input file and the second input file which is displayed and visualized on the actionable UI.

In another embodiment of the present invention, a batch analysis of the first input file and the second input file is carried out on the actionable UI, in which multiple first input file and the second input file are analyzed at a time. Further, the first input file and the second input file associated with an individual client and CPs is analyzed at the same time and an individual output folder with client id and timestamp is created. Further, an excel file with client ID, timestamp is generated in the output folder and output information is written into the excel file. In an exemplary embodiment of the present invention, in order to execute the batch analysis process, the batch analysis tab is selected on the actionable UI and a folder comprising all the first input files and the second input files associated with different clients are fetched from the standard directory for carrying out the batch analysis process. Further, the first input files and the second input files are mapped with each other using the client ID mentioned in their file name.

At step 704, a data enrichment process is carried out on the first input file and the second input file. In an embodiment of the present invention, the data enrichment operation comprises updating any missing client and the CPs data and company/entity data in the first input file and the hit details in the second input file based on extracted data from one or more open media sources or carrying out a contextual web search. The extracting of data from the media sources and the web based search is carried out using techniques such as, but are not limited to, a NLP search, a speech recognition technique, a phonetic finger printing technique, a content understanding technique, an image recognition technique and a sentiment analysis technique. The client and CPs data in the first input file, as provided in Table 1, includes, but is not limited to, middle name, date of birth (DOB), gender and nationality of the client and the CPs. The hit details in the second input file relates to individual or company/entity details associated with the client and the CPs. Further, the enriched client and CPs data is stored in the database 130. In an embodiment of the present invention, the data enrichment operation may be auto-scheduled for execution at a pre-defined time period, without any manual intervention, and the database 130 is updated with the enriched client and CPs data.

In an embodiment of the present invention, the data enrichment operation is performed by analyzing the first input file and the second input file for any missing data related to client and CPs and individual or company/entity data associated with the client and the CPs respectively. One or more URLs (e.g. 20 URLs) are extracted from the open media sources based on a search query for capturing client and CPs data and carrying out the data enrichment operation. In an exemplary embodiment of the present invention, the search query may include, but is not limited to, 'full name of client and CPs and entity'. The data enrichment may further be carried out from the data sources that the organization has subscribed to. Thereafter, one or more priority URLs are segregated from the extracted URLs. The priority URLs relates to the most relevant ULRs such as, but are not limited to, zoominfo.com/directory/person/, marketscreener.com/business-leaders, crunchbase.com/person/, etc. The URLs are directly extracted without using NLP or by partially using NLP. In an exemplary embodiment of the present invention, gender of the client and CPs is extracted from the priority URLs. In the event gender information is not available in the URLs then a 'gender guesser' library is used to determine the gender from the name of the client and the CPs. In another exemplary embodiment of the present invention, client, CPs and entity data is extracted from one or more non-priority ULRs. The data enrichment unit 114 is configured to determine if the clients and CPs name and entities exist in the non-priority URL text. Further, regular expressions are deployed from the non-priority URLs to match the client and CPs data (e.g. age, nationality, etc.) and entity data and to extract the client, CPs and entity data. Further, at least a named entity recognition technique is utilized to extract one or more past entities data. In an exemplary embodiment of the present invention, a combination of spaCy and NLTK libraries is used to discard irrelevant entities data. In a scenario, if no client, CPs and entity data are extracted from open media sources then an empty entry is created in the first input file and the second input file respectively, with only a primary key relating to the existing client, CPs data and entity data.

At step 706, a matching operation between the first input file and the second input file is performed. In an embodiment of the present invention, the matching operation between the enriched first input file and the second input file relates to matching of client's and CPs attributes such as, but are not limited to, names, date of birth, gender, nationality, in the event the CP is an individual person. Further, if the CP is a company or an entity, then a separate entity based matching process is carried out. In an exemplary embodiment of the present invention, matching operation carried out between the first input file and the second input file is illustrated in a flow chart in FIG. 2 in the event of the CP being an individual person. In another exemplary embodiment of the present invention, the matching operation between the first input file and the second input file is illustrated in a flow chart in FIG. 3 in the event of the CP being a company or an entity. Further, the data matching unit 116 is configured to classify the matching results of the first input file and the second input file as a true match, a false match and a potential match, as illustrated in Table 3.

In an embodiment of the present invention, hierarchical matching operation of client and CPs attributes between the first input file and the second input file is performed, in the event the CPs is an individual person, as illustrated in FIG. 2. The client and CPs attributes used for matching the first input file and the second input file includes, but are not limited to, a first name, a middle name (if present), a last name, date or year of birth, gender, nationality and entity matching. Further, as illustrated in FIG. 2, a 'yes' is determined for a successful matching operation of the client and CPs attributes between the first input file and the second input file and determined as the true match in the event the client and CPs attributes data is identical between the first input file and the second input file. Further, 'yes' is also determined for missing client and CPs attributes between the first input file and the second input file despite carrying out the web search. As illustrated in FIG. 2, a 'no' is determined for an unsuccessful matching operation of the client and CPs attributes between the first input file and the second input file and determined as the false match in the event the client and CPs attributes data are not identical in the first input file and the second input file. Further, if the client and CPs attributes is identified as missing or not determinable between the first input file and the second input file then the match between the first input file and the second input file is determined as the potential match. Further, a feedback loop is applied on the potential matches using an evolutionary learning technique for reinforcing learning and improving accuracy of matching outputs and further generating new scenarios for continuously enriching data repository 126.

In an embodiment of the present invention, one or more cognitive techniques are applied for matching client and CPs attributes between the first input file and the second input file. In an exemplary embodiment of the present invention, the data matching unit 116 is configured to apply one or more name matching techniques for matching clients and CPs name attributes in the first input file and the second input file, as illustrated in FIG. 4. The one or more name matching techniques includes, but are not limited to, a direct string match technique, a short name match technique, a phonetic match technique, an abbreviated name match technique, a fuzzy match technique and a combination thereof. In an example, as illustrated in FIG. 4, the direct string match technique is employed for determining an exact match of the client and CPs names in the first input file and the second input file (e.g. Alexander Robert=Alexander Robert). The short name match technique is employed to check if the client and CPs nick names in the first input file and the second input file exactly match (e.g. Alexander Robert=Alex Robert). Further, the phonetic match technique is employed to check if the client and CPs phonetic names in the first input file and the second input file exactly match (e.g. Anna Fox=Ana Fox, Stephen Levy=Stephen Levie). Furthermore, the abbreviated name match technique is employed to check if the client and CPs abbreviated names in the first input file and the second input file exactly match (e.g. Robert H. Smith=R. Hallow Smith=Robert Hallow S. Lastly, the fuzzy match technique is employed to check if the client and CPs reordered first, middle and last names in the first input file and the second input file match exactly (e.g. Robert H. Swan=H. Robert Swan). In another exemplary embodiment of the present invention, clients and CPs date of birth and year of birth attributes are matched in the first input file and the second input file based on applying a cutoff value of ±3 years. In yet another exemplary embodiment of the present invention, the data matching unit 116 is configured to match other attributes (such as, gender and nationality) of the clients and CPs in the first input file and the second input file by employing an exact matching technique.

In an embodiment of the present invention, the matching operation is performed by applying one or more cognitive techniques of matching client and CPs attributes between the first input file and the second input file in the event the CPs is a company or an entity, as illustrated in FIG. 3. The cognitive techniques include, but are not limited to, direct string match, fuzzy match and list match. Further, an association between two entities is determined. For example, two entities may be determined as subsidiary of a parent entity, an entity 1 is determined as a subsidiary of an entity 2 and an entity 1 may have been renamed to an entity 2. In an embodiment of the present invention, as illustrated in FIG. 3, if there is a correlation between the CPs and the entities present in the first input file and the second input file then the match is determined as the potential match. In the event no correlation is determined between the CPs and the entity present in the first input file and the second input file, then the match is identified as the false match. Further, if second input file has one or more negative phrases such as, but are not limited to, bogus entity, unauthorized firm, clone entity and clone firm, then the match is identified as the false match.

At step 708, adverse data associated with a client and connected parties (CPs) is determined and extracted. In an embodiment of the present invention, adverse data for the clients and the CPs attributes is determined as the true match and potential match in the first input file and the second input file. The adverse data represents negative news and opinions associated with client and CPs. In an embodiment of the present invention, the adverse data relating to the client, CPs and entities is extracted from the web sources by deploying a dynamic catalogue of pre-defined number of adverse keywords (e.g. 105 or more adverse keywords along with synonyms) stored in a data repository 126. The adverse keywords may include, but are not limited to, bribery, imprisonment, money laundering, sanctions and tax evasion. Further, the entire dynamic catalogue of the adverse keywords is deployed as a single search string, instead of deploying in the form of a sequence. The adverse data from the web may be extracted from social media, blogs, videos, news websites, etc. Furthermore, the URL links on the web sources associated with the adverse data is stored in the data repository 126 for future use.

In an exemplary embodiment of the present invention, at least three combinations of client, CPs and entity data are used as search queries for extracting adverse data associated with the client, CPs and entities from the web source. The three combination may include, CP full name and entity first word, CP first name, CP last name and entity first word and CP last name, CP first name and entity first word. Further, if a minimum of two or more words from the dynamic catalog of the adverse keywords are found in the data associated with the client, CPs and entities, then the data is determined as adverse data from the most relevant five web pages on the web source.

In an embodiment of the present invention, at least a text-summation technique and a sentiment analyzer technique such as, but is not limited to, a VADER sentiment analyzer technique is applied for analyzing severity of the adverse data associated with the clients, CPs and entities on the web source. Further, the VADER sentiment analyzer technique computationally determines whether the data on the web source is positive, adverse or neutral. A sentiment score for each client, CPs and entities is computed based on the extracted adverse data. The computed sentiment score is used to rank the extracted adverse data based on severity of the adverse data such that the adverse data having maximum score is ranked first and the adverse data having the minimum score is ranked last. The sentiment score indicates relevance of the URL links from which adverse data was extracted. Further, the sentiment score is used to determine a percentage match between the client, CPs and entities and the hit file. In an embodiment of the present invention, a summary of the extracted adverse data is generated by using a newspaper library to summarize the adverse data from the URLs on the web sources.

At step 710, the extracted adverse data is cleaned and filtered. In an embodiment of the present invention, the extracted adverse data associated with the client, CPs and entities is analyzed for cleaning and filtering the extracted adverse data associated with the clients, CPs and entities. The cleaning and filtering of the extracted adverse data includes, but is not limited to, removing Hypertext Markup Language (HTML) headers, script headers, footers and other unwanted source information. The cleaned and filtered adverse data is further processed by passing through a filter, which searches for various combinations of the first name, middle name (if present) and the last name of the client and CP in the adverse data. Further, if the combination of first name, middle name (if present) and the last name of the client and CP in the adverse data is present, then a pre-defined number of data characters (e.g. 3000 data characters) is extracted starting from the point where this combination is present in the adverse data. The pre-defined number of data characters extracted is referred to as text filtered in the source. Further, spaCy and NER techniques are used on extracted data characters to extract the names of the entities related to the client and CPs.

In an embodiment of the present invention, names of the entities are matched with one or more Political Exposed People (PEP) keys present in an excel file stored in the database 130. Further, if a match is determined between the entities manes and one or more PEP keys then match is determined as a PEP information and the various PEP related columns of the output file are populated, as illustrated in Table 4. Further, if a match is not determined between the extracted entities names and the PEP keys then the entities names are matched with the pre-defined number of data characters directly. Further, if the extracted entities match with the pre-defined number of data characters then the match is determined as the PEP information and the various PEP related columns of the output file are populated. In an exemplary embodiment of the present invention, the determined PEP information is populated in three columns, i.e. PEP keyword, PEP info and PEP URL, in the output file, as explained later in the specification. The PEP keyword represents PEP keys determined from the data present in the adverse data. PEP info represents portion of the adverse data in which the PEP keys are determined. PEP URL represents URL evidencing PEP info. Further, if no PEP information is determined for the client and CPs, then all three columns in the output file are populated with the text 'not applicable' NA.

At step 712, an output folder comprising CP details and hit details are generated. In an embodiment of the present invention, an output folder associated with client and CPs ID and a timestamp is generated. The output folder comprises the output file in an excel file format, as illustrated in Table 4. The output file includes two tables in a single file sheet comprising clients and CPs data and entities data and hit data with summary. In an embodiment of the present invention, the output file may be visualized on the actionable UI. Further, the generated output file is stored in the data repository 126 for future retrieval.

Advantageously, in accordance with various embodiments of the present invention, the present invention provides for an efficient end-to end automated data screening for background verification. The present invention provides for automated and integrated client screening by enriching, synthesizing, reviewing, validating and adjudicating the data of the clients and connected parties (CPs). Further, the present invention provides for screening of the clients, CPs and entities for negative engagements of the clients and CPs by determining adverse data using web-scraping technique. Further, the present invention provides for efficiently capturing missing data related to client and CPs by carrying out the enrichment operation. Furthermore, the present invention provides for efficient processing of data in various internal and external data sources and databases containing adverse data associated with the clients and CPs. Furthermore, the present invention provides for efficient analysis of data from internal and external data sources for data curation and summarization, thereby determining intent in the data using logical decisioning technique. Yet further, the present invention provides for generating a consolidated data repository for compliance tracking, real-time and storing interactive intelligence summary reports for visualization on the customizable actionable UI.

Figure 8:
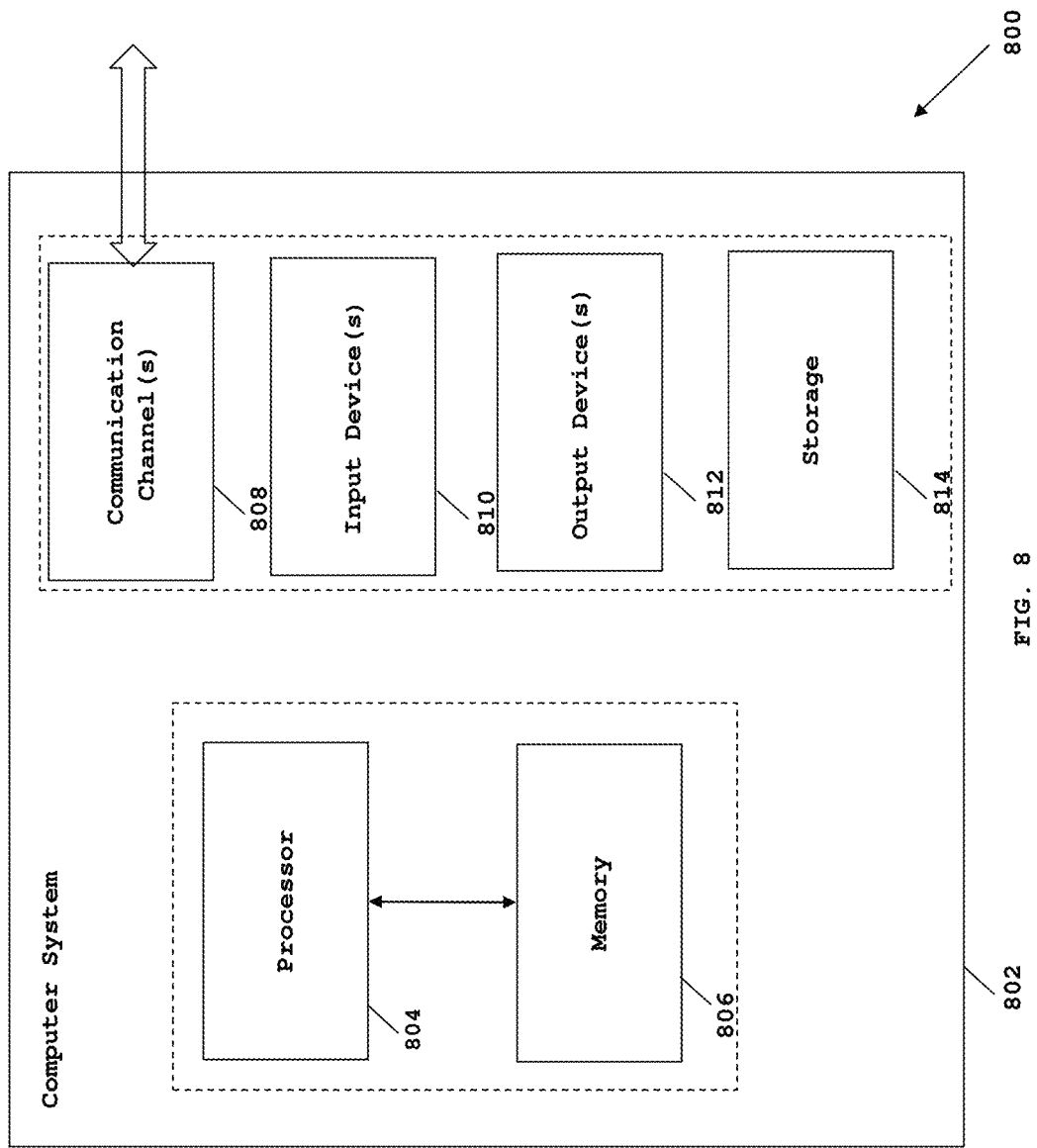
FIG. 8 illustrates an exemplary computer system in which various embodiments of the present invention may be implemented.

FIG. 8 illustrates an exemplary computer system in which various embodiments of the present invention may be implemented. The computer system 802 comprises a processor 804 and a memory 806. The processor 804 executes program instructions and is a real processor. The computer system 802 is not intended to suggest any limitation as to scope of use or functionality of described embodiments. For example, the computer system 802 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 806 may store software for implementing various embodiments of the present invention. The computer system 802 may have additional components. For example, the computer system 802 includes one or more communication channels 808, one or more input devices 810, one or more output devices 812, and storage 814. An interconnection mechanism (not shown) such as a bus, controller, or network, interconnects the components of the computer system 802. In various embodiments of the present invention, operating system software (not shown) provides an operating environment for various softwares executing in the computer system 802, and manages different functionalities of the components of the computer system 802.

The communication channel(s) 808 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 810 may include, but not limited to, a keyboard, mouse, pen, joystick, trackball, a voice device, a scanning device, touch screen or any another device that is capable of providing input to the computer system 802. In an embodiment of the present invention, the input device(s) 810 may be a sound card or similar device that accepts audio input in analog or digital form. The output device(s) 812 may include, but not limited to, a user interface on CRT or LCD, printer, speaker, CD/DVD writer, or any other device that provides output from the computer system 802.

The storage 814 may include, but not limited to, magnetic disks, magnetic tapes, CD-ROMs, CD-RWs, DVDs, flash drives or any other medium which can be used to store information and can be accessed by the computer system 802. In various embodiments of the present invention, the storage 814 contains program instructions for implementing the described embodiments.

The present invention may suitably be embodied as a computer program product for use with the computer system 802. The method described herein is typically implemented as a computer program product, comprising a set of program instructions which is executed by the computer system 802 or any other similar device. The set of program instructions may be a series of computer readable codes stored on a tangible medium, such as a computer readable storage medium (storage 814), for example, diskette, CD-ROM, ROM, flash drives or hard disk, or transmittable to the computer system 802, via a modem or other interface device, over either a tangible medium, including but not limited to optical or analogue communications channel(s) 808. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the scope of the invention.

We claim:

1. A method for automated data screening for background verification, wherein the method is implemented by a processor executing instructions stored in a memory, the method comprises:

analyzing a first input file and a second input file, wherein the first input file is representative of client data and Connected Parties (CPs) data and the second input file is representative of a hit file which provides hit details extracted from an internal database of an organization or from external data providers of the organization that are subscribed to by evaluating historical data;

performing a data enrichment operation on the first input file and the second input file based on captured client and CPs data from one or more Universal Resource Locators (URLs) which are extracted from one or more open media sources or from the data sources that the organization has subscribed to obtain an enriched first input file and second input file, and wherein one or more priority URLs are segregated from the extracted URLs for carrying out the data enrichment operation;

performing a matching operation between the enriched first input file and the second input file, wherein matched results of the first input file and the second input file are classified as a true match or a false match or a potential match;

determining adverse data associated with the clients and the CPs data determined as the true match and the potential match in the first input file and the second input file, and wherein a sentiment score is computed for each of the client and CPs data based on the extracted adverse data;

cleaning and filtering the extracted adverse data to generate screened data associated with the clients and the CPs data; and generating an output folder comprising an output file including the screened client and CPs data and hit data.

2. The method as claimed in claim 1, wherein the data enrichment operation is associated with updating any missing client and CPs data in the first input file and the hit details in the second input file based on extracted data from one or more open media sources or carrying out a web search, and wherein extraction of data from the media sources and the web based search is carried out based on a Natural Language Processing (NLP) search, a speech recognition technique, a phonetic finger printing technique, a content understanding technique, an image recognition technique and a sentiment analysis technique.

3. The method as claimed in claim 1, wherein the client and CPs data is extracted from one or more non-priority ULRs if it is determined that the clients and CPs name exists in the non-priority URL text, and wherein regular expressions are deployed from the non-priority URLs to match the client and CPs data and to extract the client and CPs data.

4. The method as claimed in claim 1, wherein a hierarchical matching operation of client and CPs data between the first input file and the second input file is performed if the CPs is an individual person, and wherein a separate entity based matching process is carried out, if the CPs is a company or an entity.

5. The method as claimed in claim 1, wherein a successful matching operation of the client and CPs data between the first input file and the second input file is determined as the true match if the client and CPs data is identical in the first input file and the second input file, and wherein an unsuccessful matching operation of the client and CPs data between the first input file and the second input file is determined as the false match if the client and CPs data is not identical in the first input file and the second input file, and wherein if the client and CPs data is missing or not determinable between the first input file and the second input file then the match between the first input file and the second input file is determined as the potential match, and wherein a feedback loop is applied on the potential matches using an evolutionary learning technique for reinforcing learning and improving accuracy of matching outputs.

6. The method as claimed in claim 1, wherein the adverse data associated with the client and CPs data is determined and extracted from web sources by deploying a dynamic catalogue of pre-defined number of adverse keywords, and wherein the dynamic catalogue of the adverse keywords is deployed as a single search string, and wherein at least three combinations of client and CPs data are used as search queries for extracting the adverse data associated with the client and CPs data from the web source, the three combinations includes CP full name and entity first word, CP first name, CP last name and entity first word and CP last name, CP first name and entity first word.

7. The method as claimed in claim 6, wherein if a minimum of two or more words from the dynamic catalog of the adverse keywords are found in the client and CPs data then the client and CPs data is determined as adverse data from relevant five web pages on the web source.

8. The method as claimed in claim 1, wherein the computed sentiment score is used to rank the extracted adverse data based on severity of the adverse data such that the adverse data having maximum score is ranked first and the adverse data having the minimum score is ranked last, and wherein the sentiment score is used to determine a percentage match between the client and CPs data and the hit file.

9. The method as claimed in claim 1, wherein the cleaned and filtered adverse data is processed by passing through a filter for searching various combinations of a first name, a middle name and a last name of the client and CPs in the adverse data, and wherein if the combination of first name, middle name and the last name of the client and CPs in the adverse data is present then a pre-defined number of data characters is extracted starting from the point where this combination is present in the adverse data.

10. The method as claimed in claim 1, wherein the output folder is associated with client and CPs ID and a timestamp, and wherein the output folder comprises the output file in an MS excel file format, and wherein the output file includes two tables in a single file sheet comprising the client and CPs data and hit data with a summary, and wherein the output file is visualized on an actionable UI.

11. A computer program product comprising:

a non-transitory computer-readable medium having computer program code store thereon, the computer-readable program code comprising instructions that, when executed by a processor, caused the processor to:

analyze a first input file and a second input file, wherein the first input file is representative of client data and Connected Parties (CPs) data and the second input file is representative of a hit file which provides hit details extracted from an internal database of an organization or from external data providers of the organization that are subscribed to by evaluating historical data;

perform a data enrichment operation on the first input file and the second input file based on captured client and CPs data from one or more Universal Resource Locators (URLs) which are extracted from one or more open media sources or from the data sources that the organization has subscribed to obtain an enriched first input file and second input file, and wherein one or more priority URLs are segregated from the extracted URLs for carrying out the data enrichment operation;

perform a matching operation between the enriched first input file and the second input file, wherein matched results of the first input file and the second input file are classified as a true match or a false match or a potential match;

determine adverse data associated with the clients and the CPs data determined as the true match and the potential match, and wherein a sentiment score is computed for each of the client and CPs data based on the extracted adverse data;

clean and filter the extracted adverse data to generate screened data associated with the clients and CPs data; and generate an output folder comprising an output file including the screened client and CPs data and hit data.

\* \* \* \* \*